United States Patent [19]

Hazen

[11] 3,797,513

[45] Mar. 19, 1974

[54] DOSING SYPHON

[75] Inventor: Thamon E. Hazen, Ames, Iowa

[73] Assignee: Iowa State University Research Foundation, Ames, Iowa; by said Hazen

[22] Filed: Sept. 11, 1972

[21] Appl. No.: 287,672

[52] U.S. Cl............... 137/132, 119/72, 137/247.25
[51] Int. Cl............................................ F04f 10/02
[58] Field of Search........... 4/101; 119/77; 137/123, 137/132, 133, 134, 135, 136, 137, 138, 139, 247.25

[56] References Cited
UNITED STATES PATENTS

| 1,016,676 | 2/1912 | Dale | 137/247.25 |
| 557,560 | 4/1896 | Hunt | 137/138 |
| 210,965 | 12/1878 | Rhoads | 137/138 X |

FOREIGN PATENTS OR APPLICATIONS

| 180,225 | 9/1887 | France | 137/139 |
| 834,327 | 12/1927 | Australia | 137/138 |
| 142,636 | 4/1883 | France | 137/139 |
| 568,231 | 3/1924 | France | 137/132 |
| 55,766 | 4/1891 | Germany | 137/123 |

Primary Examiner—Alan Cohan
Assistant Examiner—Gerald A. Michalsky
Attorney, Agent, or Firm—Zarley, McKee & Thomte

[57] ABSTRACT

A dosing syphon for hydraulic transport of livestock and poultry wastes is disclosed. The dosing syphon comprises a fluid reservoir having a bell compartment means therein which is spaced from the bottom portion of the fluid reservoir. The bell compartment has a closed upper portion and a lower portion in communication with the interior of the housing for receiving fluid from the interior thereof. A substantiallly vertical conduit having an open upper end is positioned within the bell compartment and extends downwardly and outwardly through the housing. The vertical conduit includes a trap element for capturing a quantity of fluid therein. The vertical conduit has a fluid charging opening formed therein at the upper end therein above the bottom portion of the bell compartment so that a supply of fluid will be available to the trap while the fluid level rises within the bell compartment but before the fluid flows into the upper end of the compartment so that a constant supply of fluid will be available in the trap element.

6 Claims, 2 Drawing Figures

PATENTED MAR 19 1974  3,797,513
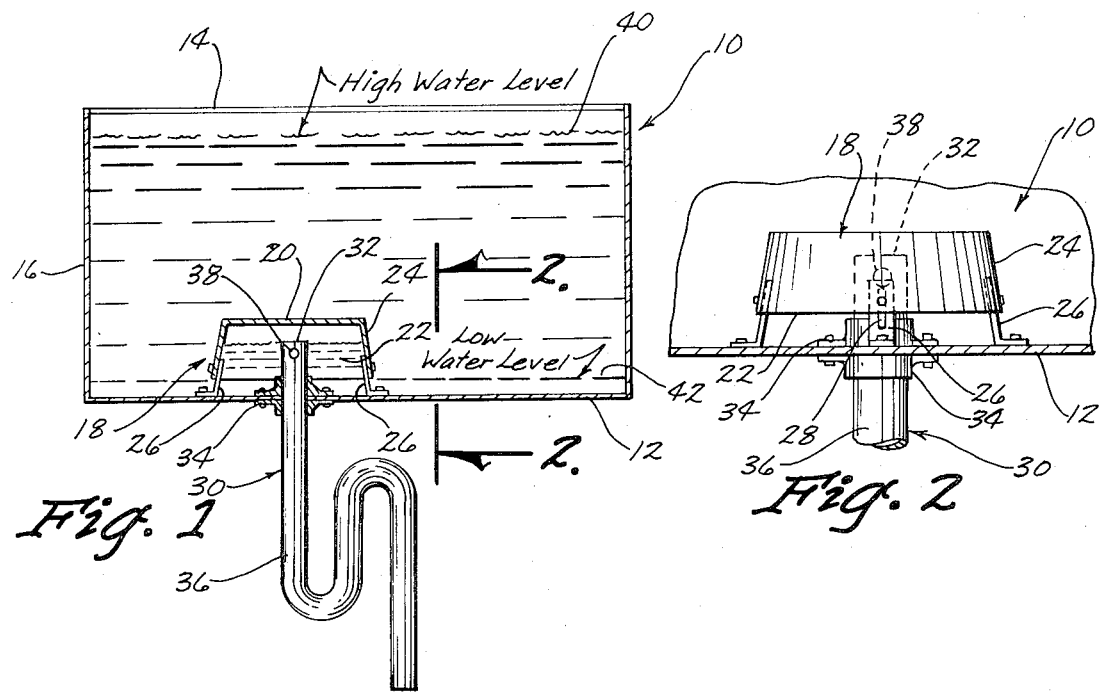

DOSING SYPHON

The problem of removing manure from swine and poultry buildings is a troublesome one. One method for removing manure from swine buildings is the open flushing gutter than runs through the pen area. Hogs learn to defecate and urinate in the gutter. Cleaning water is discharged down the gutter at 100 to 150 gallons per minute which carries the manure from the building to a storage pit or waste treatment device. One of the problems associated with the flushing gutter system has been to devise equipment that will dependably discharge cleaning water into the gutter.

Therefore, it is a principal object of this invention to provide an improved dosing syphon.

A further object of this invention is to provide an improved dosing syphon for discharging clean water into flushing gutters.

A still further object of this invention is to provide a dosing syphon for hydraulic transport of livestock and poultry wastes.

A further object of this invention is to provide a dosing syphon having means thereon to insure that the trap associated therewith will be properly charged.

A further object of this invention is to provide a dosing syphon which automatically supplies water to a flushing gutter system.

A further object of this invention is to provide a dosing syphon having the ability to rapidly discharge water into a flushing gutter system.

A further object of this invention is to provide an improved dosing syphon which is economical of manufacture and durable in use.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a partial sectional view of the dosing syphon; and

FIG. 2 is a sectional view as seen along lines 2 — 2 of FIG. 1.

In FIG. 1, the numeral 10 generally refers to a fluid reservoir having a bottom 12, top 14 and a side wall portion 16. Fluid reservoir 10 is in communication with a water pump adapted to pump water thereinto at a predetermined rate.

The numeral 18 refers to an inverted bell compartment having a closed upper portion 20 and an open lower portion 22 which is in communication with the interior of the fluid reservoir or housing 10. As seen in FIGS. 1 and 2, the lower portion of the bell compartment is spaced above the bottom 12 of the reservoir 10. For purposes of description, bell compartment 18 will be described as having a skirt portion 24. The bell compartment 18 is secured to the bottom 12 by means of a plurality of spaced apart brackets 26. As seen in FIG. 2, the brackets 26 are provided with an elongated slot 28 therein which permits the bell compartment 18 to be selectively vertically adjusted with respect to the bottom 12.

The numeral 30 refers to a substantially vertical conduit having an open upper end 32 positioned within the bell compartment 18 and extending downwardly therefrom through the bottom 12 of the fluid reservoir 10. Suitable seal means 34 is provided around the conduit 30 and the bottom 12 as seen in FIG. 1. The numeral 36 refers to a trap portion formed in the conduit 30 to capture a quantity of fluid or water therein so that the water within the reservoir 10 will not discharge through the conduit 30 until a sufficient water level has been reached which is sufficient to overcome the head within the trap 36.

Conduit 30 has a fluid charging opening 38 formed therein at the upper end thereof which is positioned above the bottom portion of the bell compartment 18 so that a supply of fluid will be available to the trap 36 while the fluid level rises within the compartment 18. Conduit 30 is in communication with the flushing gutter system of the system.

For purposes of description, the numeral 40 refers to the high water level within the reservoir 10 while the numeral 42 will be used to identify the low water level within the reservoir 10.

Assuming that the dosing syphon has just functioned, the cycle of operation will be described with the lower water level being approximately at 42. The water pump is actuated so as to supply water to the reservoir 10 to fill the same. As the reservoir 10 is filled, the water in the compartment 18 rises at approximately the same rate as the water outside the bell compartment 18. As the water level rises inside the compartment 18, air is trapped between the water inside of the bell compartment 18 and the upper end 20 thereof. The trapped air in the bell compartment prevents the water level inside the bell compartment 18 from rising as much as the level outside the bell compartment 18. As the reservoir 10 fills, a difference in water level inside and outside the bell compartment 18 develops. This difference in water level or head compresses the air inside the bell compartment 18. The compressed air within the bell compartment 18 prevents the water from flowing downwardly through the open upper end of the conduit 30 until such time as the water within the reservoir 10 reaches the high water level 40. At the high water level 40, the head within the reservoir 10 is sufficient to overcome the head developed by the water in the trap thus forcing water out of the trap, and air out of bell compartment 18, so that the fluids within reservoir 10 are then discharged downwardly through the open upper end of the conduit 30. The water discharges from the reservoir 10 until the water reaches the approximate low level 42. The rapid rate of discharge from the reservoir 10 causes a flushing action in the flushing gutters of the system so as to hydraulically transport the animal waste from the gutters.

The dosing syphon will not function if water is not present in the trap portion 36 during the filling operation of the fluid reservoir. The rapid discharge of water from the reservoir 10 tends to pull or suck the water from the trap and the reservoir 10 will not properly fill during the next cycle since the water will simply run downwardly through the conduit 30. The charging opening 38 insures that the trap portion 36 will be properly charged so that the dosing syphon will properly function. As the fluid rises under the bell compartment during the filling operation of the reservoir 10, the liquid or fluid passes through the charging or aspiration opening 38 to charge the trap portion 36 with fluid. A small amount of fluid will trickle from the trap portion 36 into the flushing gutters but the amount does not constitute a wastage of water due to the size of the charging opening 38. Thus, the charging opening 38 insures that the trap portion 36 will be properly charged with water to prevent the fluid in the reservoir 10 from discharging therefrom until the high water level 40 is reached.

Some constructional considerations are also worthy of note. The position of the bottom of the bell compartment 18 determines the lowest level of the fluid at the end of the discharge cycle. Preferably, the position of the bottom of the bell compartment 18 should be as close to the bottom of the reservoir 10 as possible without restricting flow into the bell compartment. There is a minimum distance above the discharge end of the conduit 30 and the liquid level in the reservoir 10 with sufficient head is available to insure that full pipe flow is developed. Although such is difficult to calculate exactly, a rule of thumb is to make the distance approximately five times as great as the diameter of the conduit 30. The required volume of the bell compartment 18 is related to the volume of the inlet portion of the conduit 30 and the trap portion 36. In general, it is recommended that the volume of the bell compartment 18 be approximately five or more times the volume of the inlet pipe portion and the trap portion. The position of the upper end of the conduit 30 with respect to the bell compartment 18 is also quite important. Insufficient intrusion of the conduit 30 into the compartment will result in premature discharge and lack of full siphoning. Inadequate clearance between the top of the conduit 30 and the top portion 20 of the bell compartment 18 will restrict flow into the conduit 30 thereby reducing the rate of discharge.

Thus it can be seen that an improved dosing syphon has been provided having means to permit the trap portion of a discharge conduit to be properly charged prior to the dosing syphon rapidly discharging. The dosing syphon of this invention substantially reduces dosing syphon malfunctions and accomplishes at least all of its stated objectives.

I claim:
1. A dosing syphon, comprising,
   a fluid reservoir comprised of a housing having bottom and top portions,
   a bell compartment means in said housing and spaced from said bottom portion, said bell compartment means having a closed upper portion and a lower portion in communication with the interior of said housing for receiving fluid from the interior of said housing,
   a substantially vertical conduit extending from an upper open end within said bell compartment means downwardly and outwardly through said housing,
   a trap element in said conduit to capture a quantity of fluid therein at times,
   and a fluid charging opening formed in said conduit adjacent the open upper end thereof, said fluid charging opening being positioned below the upper open end of said conduit and above the bottom portion of said bell compartment, said fluid charging opening providing direct communication between the interior of said bell compartment means and the interior of said conduit so that a supply of fluid will be available to said trap element while the fluid level rises within said bell compartment means but before fluid flows into the upper end of said compartment, wherein a constant supply of fluid will be available in said trap element.

2. The dosing syphon of claim 1 wherein said bell compartment comprises an inverted housing member which is selectively vertically adjustably mounted in said housing with respect to the bottom of said housing.

3. The dosing syphon of claim 1 wherein said conduit comprises a vertically disposed inlet portion extending upwardly through said bottom of said housing the open upper end of said inlet portion being spaced below the said closed upper end of said bell compartment.

4. The dosing syphon of claim 1 wherein said fluid charging opening is formed in said conduit closely adjacent the upper end thereof.

5. The dosing syphon of claim 1 wherein the lower portion of the bell compartment is spaced as close to the bottom of the reservoir as possible without restricting flow into the bell compartment.

6. The dosing syphon of claim 1 wherein the volume of the bell compartment is at least five times the volume of the vertical conduit and the trap element in said conduit.

* * * * *